(12) United States Patent
Archer et al.

(10) Patent No.: US 7,385,552 B2
(45) Date of Patent: Jun. 10, 2008

(54) REAL-TIME, CROSS-CORRELATING MILLIMETER WAVE IMAGING SYSTEM USING DUAL PILL-BOX ANTENNAS

(75) Inventors: John William Archer, Pennant Hills (AU); Oya Sevimli, North Epping (AU); Geoffrey James, Epping (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 131 days.

(21) Appl. No.: 10/518,758

(22) PCT Filed: Jul. 11, 2003

(86) PCT No.: PCT/AU03/00897

§ 371 (c)(1),
(2), (4) Date: Jul. 22, 2005

(87) PCT Pub. No.: WO2004/008575

PCT Pub. Date: Jan. 22, 2004

(65) Prior Publication Data

US 2006/0049980 A1    Mar. 9, 2006

(30) Foreign Application Priority Data

Jul. 11, 2002    (AU) .............................. 2002950196

(51) Int. Cl.
*H01Q 3/20*   (2006.01)
*G01S 13/89*  (2006.01)
(52) U.S. Cl. ..................... 342/179; 342/188; 342/189; 342/191; 343/780; 343/756
(58) Field of Classification Search ................ 342/179; 343/780

See application file for complete search history.

(56) References Cited

U.S. PATENT DOCUMENTS 2,721,263 A   10/1955   Spencer (Continued)

FOREIGN PATENT DOCUMENTS

JP    A 63-94178    4/1988

(Continued)

OTHER PUBLICATIONS

European Examiner's Report dated Jun. 9, 2006 and Supplementary European Search Report dated Feb. 22, 2006.

(Continued)

*Primary Examiner*—Thomas Black
*Assistant Examiner*—Shelley Chen
(74) *Attorney, Agent, or Firm*—Kenyon & Kenyon LLP (57) ABSTRACT

A method and apparatus are disclosed for forming an image from millimeter waves. A field of view scanned using two geometrically orthogonal, intersecting copolarized fan beams (110, 120) to receive millimeter wave radiation. The received millimeter wave radiation from said fan beams are then cross-correlated (250, 650). Also, a method and antenna (400, 610) for receiving millimeter wave radiation are disclosed. The antenna includes first and second fan beam antennas (410, 420) for receiving millimeter wave radiation and a filter (430, 440) for rotating polarization of incident millimeter wave radiation through 90 degrees received by the second fan beam antenna (410). The respective first and second beams (110, 120) intersect and are co-polarized and geometrically orthogonal to each other. Still further, a millimeter wave imaging system (600) and method are also disclosed, which utilise an antenna (610) for receiving millimeter wave radiation, process the received millimeter wave radiation from the antenna (610), and build up the image (682) using a filtered, cross-correlated signal.

28 Claims, 5 Drawing Sheets

U.S. PATENT DOCUMENTS

| | | | | |
|---|---|---|---|---|
| 2,942,266 | A | * | 6/1960 | Mattingly ................... 343/782 |
| 3,187,329 | A | * | 6/1965 | Midlock ..................... 342/104 |
| 3,696,418 | A | | 10/1972 | Litchford |
| 3,714,651 | A | | 1/1973 | Lyon |
| 4,297,710 | A | * | 10/1981 | Dupressoir .................. 343/756 |
| 4,345,257 | A | * | 8/1982 | Brunner ..................... 343/780 |
| 4,724,439 | A | * | 2/1988 | Wiley et al. ................ 342/351 |
| 5,053,781 | A | | 10/1991 | Milman |
| 5,526,008 | A | * | 6/1996 | Meserole et al. ............ 343/761 |
| 6,275,196 | B1 | * | 8/2001 | Bobier ....................... 343/840 |
| 2006/0049980 | A1 | * | 3/2006 | Archer et al. ............... 342/179 |

FOREIGN PATENT DOCUMENTS

| | | |
|---|---|---|
| JP | 07-154126 | 6/1995 |
| JP | A 10-104362 | 4/1998 |

OTHER PUBLICATIONS

*A Cross-Array Radiometer for Spacecraft Applications*, W. Gregorwich, et al., XP010092217, Feb. 12, 1989.
*Millimeter Wave Twist Reflector Design Aspects*, V.G. Borkar, et al., XP00360529, Nov. 1, 1992.
*A Beam-Scanning Dual Polarized Fan-Beam Antenna Suitable for Millimeter Wavelengths*, XP001233267, Aug. 2005.

* cited by examiner

REAL-TIME, CROSS-CORRELATING MILLIMETER WAVE IMAGING SYSTEM USING DUAL PILL-BOX ANTENNAS

FIELD OF THE INVENTION

The present invention relates generally to millimeter imaging systems and in particular to a realtime millimeter imaging system for detecting millimeter wave radiation and generating a corresponding image.

BACKGROUND

Millimeter-wave imaging systems produce a picture of a scene by detecting thermally generated radiation in the 30-300 GHz range, which is emitted or reflected by objects in the field of view of the instrument. Such systems offer advantages over equivalent instruments detecting infrared and visible light, because the millimeter-wave radiation can penetrate low visibility and obscuring conditions (e.g., caused by clothing, walls, clouds, fog, haze, rain, dust, smoke, sandstorms) without the high level of attenuation that occurs at the other noted wavelengths. This is particularly the case in specific "windows" for atmospheric transmission of radio waves that occur between 90 and 110 GHz and between 210 and 250 GHz.

Millimeter-wave imaging systems may be used in a range of important applications such as: aids to aircraft landing; collision warning in air, land and sea transport; detection and tracking of ground based vehicular traffic; covert surveillance for intruders, contraband and weapons. In such applications, the availability of real-time, "movie-camera" like imaging is highly desirable. However, for such systems to find wide acceptance in the commercial market-place, the sensing instrumentation must be light in weight, small in size, and affordable in cost.

A range of millimeter-wave imaging systems have been reported, but fail to meet the size, weight, and cost requirements for wide commercial acceptance of the technology, while at the same time offering real-time moving images. Such systems use two distinct technologies: mechanical scanning of the beam of a single antenna, and two-dimensional arrays.

Mechanical scanning of the beam of a single antenna connected to a single receiving system is performed in a raster pattern over a scene to detect the emitted radiation and produce a map or image of the brightness. The angular resolution of the resultant image is determined by the width of the antenna beam, whereas the scan angle determines the field of view. Rapid real-time imaging is difficult or inadequate, because physically large and cumbersome antenna elements (required to achieve high angular resolution) must be moved quickly at high rates.

Two-dimensional arrays of electrically-small antennas and integrated receivers sample the magnitude of the received millimeter-wave signal at the focal plane of an antenna system. This information is then used to produce a snap-shot of the brightness in the field of view of the instrument. In any given plane, the angular resolution of the resultant image is determined by the number of elements across the array and the outer dimensions of the array. In contrast, the field of view is determined by the beam-width of the individual antenna-array elements. Rapid real-time imaging can be achieved with these systems. However, this occurs at the expense of large numbers (1000's) of millimeter-wave receiving sub-systems and complex electronic phase shifting and amplitude weighting networks. Because of the large number of receivers required, heterodyne systems are avoided (in view of the local oscillator distribution problems) in favour of direct detection systems, with the attendant problems of gain stability and poorer sensitivity. Coherent local oscillator distribution to such a large number of millimeter-wave heterodyne receivers presents significant difficulties.

Thus, a need clearly exists for an improved real-time millimeter-wave imaging system capable of producing real-time, movie-like imaging, in which the system is more compact, less complex, and less expensive to produce.

SUMMARY

In accordance with a first aspect of the invention, an image is formed from millimeter waves. To do so, a field of view is scanned using two geometrically orthogonal, intersecting co-polarized fan beams to receive millimeter-wave radiation. The components of received millimeter-wave radiation from the two fan beams are cross-correlated. The polarizations of the electric fields of the two fan beams are arranged to be substantially parallel in alignment. This may be achieved by polarization rotation filtering of the millimeter-wave radiation received in one of the fan beams. The two fan beams may be scanned in azimuth and elevation defining a scan range. The intersection region of the two fan beams is able to cover any point in the scan range. The scan range determines the field of view and a beam width of each fan beam in the narrow direction determines an angular resolution of the image. The cross-correlated output is measured at each point in the field of view to produce a map of the brightness. The position of the two geometrically orthogonal, intersecting fan beams may be controlled to generate the cross-correlated output at each fan beam intersection point in the field of view. Preferably, the scanning is implemented using a dual fan-beam antenna The dual fan-beam antenna may have two modified pill-box antennas and a polarization rotator to change the direction of the incident polarization for one of the modified pill-box antennas. An image may be formed from millimeter waves of a different polarization by having a polarization rotator to change the direction of the incident polarization for a different modified pill-box antenna, only one polarization rotator being used at any time.

In accordance with a second aspect of the invention, millimeter-wave radiation is received. A field of view is scanned using a fan beam to receive millimeter-wave radiation. Polarization of incident millimeter-wave radiation is rotated through 90 degrees, and the field of view is scanned using another fan beam to receive the polarization-rotated millimeter-wave radiation. The fan beams intersect and are geometrically orthogonal to each other, yet the radiation is co-polarized. The fan beams are provided by respective fan-beam antennas. Each such antenna may include a modified pill-box antenna. Preferably, the modified pill-box antenna includes: a metal housing with an elongated aperture in at least one side of the housing, a curved primary reflector surface located within the housing and opposite the aperture, a feed horn within the housing, and one or more sub-reflectors for coupling the feed horn to the primary reflector surface. At least one of the sub-reflectors is designed to rotate, providing one-dimensional beam scanning in the narrow direction of the fan beam. The polarization rotation for a fan beam may be implemented using a polarization rotating transreflector.

Preferably, the transreflector includes: a planar metallic reflector, and a grid of closely spaced wires. The wires are preferably spaced $n \times \lambda/4$ from the planar metallic reflector, where n is an odd integer and $\lambda$ is a wavelength of the millimeter-wave radiation. The polarization rotating transreflector may be positioned at a 45 degree angle relative to the aperture of the second fan-beam antenna and at a substantially 45 degree angle relative to the direction of incident millimeter-wave radiation. The polarization rotation for a fan beam may be switched by exchanging a polarization rotating transreflector and a planar metallic reflector, both aligned in the same way. An exchange may be effected by turning a polarization rotating transreflector by 180 degrees to use its back surface as a planar metallic reflector. An exchange may be effected by making the wires of a polarization rotating transreflector out of a material that has a switchable conductivity.

In accordance with a third aspect of the invention, millimeter wave radiation is received for generating an image. To do so, millimeter wave radiation is received in accordance with first and second fan beams. The first and second fan beams are geometrically orthogonal to each other and intersecting. The millimeter wave radiation received in accordance with the second fan beam is co-polarized with the millimeter wave radiation received in accordance with the first fan beam. Components of the millimeter wave radiation received in accordance with the first and second beams are downconverted to generate respective intermediate frequency (IF) signals. The IF signals are cross-correlated. The resulting cross-correlated signal is filtered to provide a value proportional to brightness at each point in the scene. The received millimeter wave radiation may be amplified in accordance with the first and second beams prior to the step of downconverting.

In accordance with a fourth aspect of the invention, millimeter-wave imaging is disclosed. To do so, millimeter-wave radiation is received. The receiving includes: receiving millimeter-wave radiation by scanning a field of view using a fan beam, rotating the polarization of incident millimeter-wave radiation through 90 degrees, and receiving the polarization-rotated millimeter-wave radiation by scanning a field of view using another fan beam. The fan beams intersect and are geometrically orthogonal to each other. The received millimeter-wave radiation is processed. The processing step includes: receiving components of millimeter-wave radiation from the antenna received in accordance with the fan beams, downconverting respective components of the received millimeter wave radiation received to generate respective intermediate frequency (IF) signals, cross-correlating the IF signals; and filtering the resulting cross-correlated signal. The filtered, cross-correlated signal is proportional to the brightness at each point in the field of view as the antenna beams are scanned. In this way, an image of the scene may be built up. The scanning of each fan beam may be independently controlled as required so that the image can be generated from the filtered, cross-correlated output signal which provides a value proportional to the brightness of the scene at each point in said field of view.

BRIEF DESCRIPTION OF THE DRAWINGS

A small number of embodiments are described hereinafter with reference to the drawings, in which.

DETAILED DESCRIPTION

A method and an apparatus for forming an image from millimeter waves, a method and an antenna for receiving millimeter wave radiation, a method and an apparatus for receiving millimeter wave radiation for generating an image, and a method and a system for millimeter wave imaging are disclosed. In the following description, numerous specific details are set forth. In the other instances, details well known to those skilled in the art may not be set out so as not to obscure the invention. It will be apparent to those skilled in the art in the view of this disclosure that modifications, substitutions and/or changes may be made without departing from the scope and spirit of the invention.

The embodiments of the invention involve improved imaging methods, antennas, and systems that enable the realization of a simple, low-cost instrument, capable of realtime imaging of moving targets. In broad terms, the embodiments produce a map or image of the millimeter-wave brightness in the field of view of the instrument by cross-correlating the signal received from two orthogonal, intersecting fan-beams.

Fan-Beam Antennas Generally

An antenna with a fan-beam radiation pattern detects radiation from a region in the field of view that is of narrow angular extent in one direction only, while possessing a broad pattern in the orthogonal plane. Typically, a fan-beam can be generated by an antenna, or array of antennas, which is essentially one-dimensional (e.g., a long narrow slot, a linear array of slots, or a linear array of patch antennas). The width of the beam in the narrow direction is inversely proportional to the electrical length of the aperture or array. In contrast, the beam-width in the broad direction is inversely proportional to the width of the aperture or an individual element of the array. The angular position of the fan-beam in the narrow direction may be scanned across the field of view by producing a varying linear gradient in the phase of the electrical excitation across the aperture or across the elements of the array.

Figure 1:
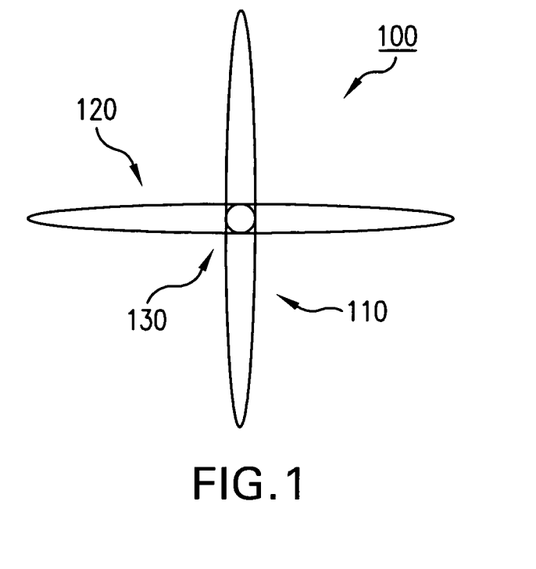
FIG. 1 is a radiation pattern of two crossed fan beam antennas in accordance with the embodiments of the invention.

In accordance with embodiments of the invention, two such fan beams are arranged so that the beams intersect at right angles in the field of view of the instrument. FIG. 1 is a plot illustrating the radiation pattern 100 of two crossed fan beam antennas. The pattern 100 includes an E-plane, fan-beam antenna pattern 110 and an H-plane, fan-beam antenna pattern 120, and a pencil beam pattern 130. The polarization of the electric field in each beam is arranged to be parallel in alignment. As the fan-beams 110, 120 are scanned in azimuth and elevation, the intersection region 130 can be made to cover any point in the scan range. Thus, the scan range determines the field of view of the instrument and the beam-width of the fan-beam in the narrow direction determines the angular resolution of the image. The millimeter-wave brightness at any point in the image is proportional to the cross-correlation between the signals received by the two antenna systems.

Imaging Receiver System

A significant component of the imaging system is the receiver, which takes the output from the antennas, amplifies the signals, and then down-converts the amplified signals to a convenient intermediate frequency at which the cross-correlation can take place. There are a number of possible implementations for such receiving systems, depending upon the design of the fan-beam antenna.

Figure 2:
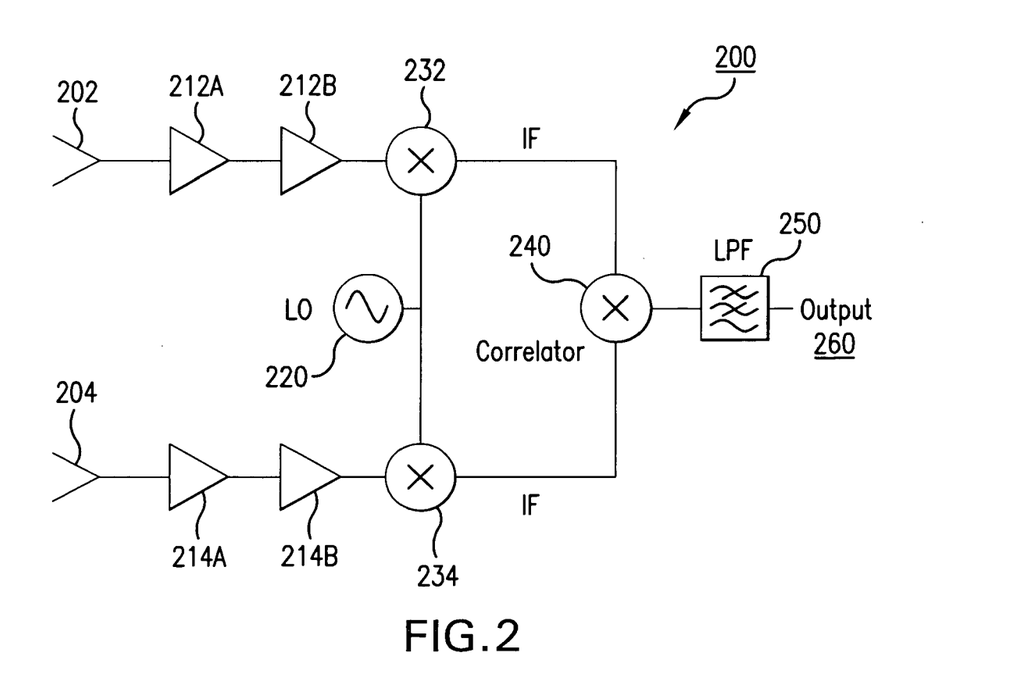
FIG. 2 is a simplified block diagram of a real-time millimeter-wave imaging system in accordance with an embodiment of the invention.

An imaging receiver system 200 in accordance with an embodiment of the invention shown in FIG. 2 uses only two receivers, one connected to an antenna 202 scanning in the vertical direction and the other to an antenna 204 scanning in the horizontal plane, to sample the whole image. The antenna 202 is an E-plane antenna, and the antenna 204 is an H-plane antenna. The E-plane antenna is coupled to one or more radio frequency (RF) low noise amplifiers (LNAs) 212a, 212b. The output of the one or more low noise amplifiers 212b is coupled to a respective block down converter 232. Similarly, the H-plane antenna 204 is coupled to one or more LNAs 214a, 214b. The output of the LNA 214b is coupled to a further block down converter 234. A local oscillator 220 provides an input to both block down converters 232, 234.

The respective block down converters 232, 234 produce respective intermediate frequency (IF) signals that are both provided to a correlator 240. The output of the correlator 240 is provided to a low pass filter 250, which produces the output signal 260. A map of the millimeter-wave brightness at each point in the field of view is produced by scanning the antenna beams over the field and at each field point measuring the cross correlation between the receiver outputs using a broadband analogue multiplier 240.

A polarization rotating filter (not shown) may be placed in front of one of the antenna apertures so that both fan beams operate in the same polarization.

Antenna for Imaging System

Figure 3:
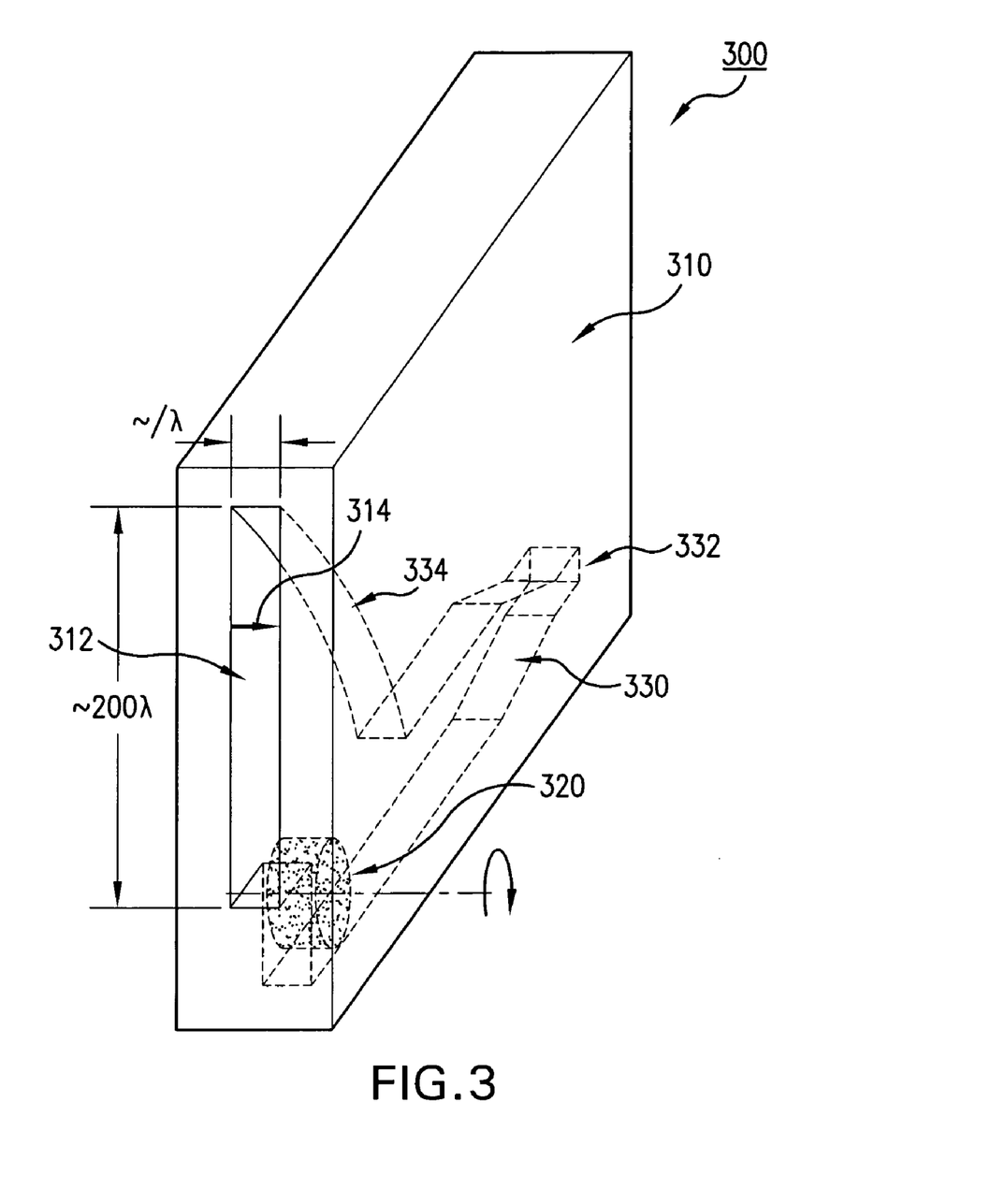
FIG. 3 is a perspective view of an example of a pill-box antenna for implementing a scanned-beam imaging system in accordance with another embodiment of the invention.

In accordance with an embodiment of the invention, a simple, inexpensive implementation uses a multiple reflector "pill-box" style antenna 300 shown in FIG. 3. In this simplified example, a shaped primary reflector 334 is coupled to a single feed-horn 330, 332 via a rotating sub-reflector 320, which provides beam scanning as the sub-reflector 320 spins. More than one sub-reflector may be practiced, with at least one sub-reflector rotating to provide beam scanning. With careful mechanical and electrical design, in which the rotating sub-reflector 320 rotates about its center of mass, high speed scanning can be achieved. Preferably, the sub-reflector 320 is disc-like in form. A significant advantage of this system is that only a single heterodyne receiver per beam is needed. This is advantageous from the point of view of system simplicity and cost and also because a simple local oscillator distribution system is possible without the need for complex array phasing.

In a conventional "pill-box" antenna, a parabolic cylinder is used as the reflector. The "pill-box" is formed by two parallel planes which cut through the parabolic cylinder perpendicular to the cylinder elements. Typically, the focal line of the cylinder is positioned in the center of the aperture formed by the open ends of the parallel plates. When a feed horn is placed at the focal line, the feed horn blocks a significant portion of the aperture, resulting in large sidelobes in the far-field pattern of the antenna as well as standing waves within the "pill-box" itself.

Much improved performance can be obtained when an offset feeding arrangement is used, so that only one side of the "pill-box" is illuminated. The arc of the parabola does not include its vertex, and the feed horn points to illuminate this arc. Even though the illumination is asymmetric, good sidelobe performance is obtained. Alternatively, the "pill-box" antenna may be symmetrical about the axis of the parabola, but arranged as a folded lens to avoid blockage. Such an antenna, however, is more difficult to manufacture than an unfolded design.

The millimeter-wave fan-beam antenna 300 shown in FIG. 3 includes a metal housing 310 with a radiating aperture 312 formed in one side of the metal housing. The length of the radiating aperture 312 is approximately 200 wavelengths ($\lambda$) and the width of the aperture 312 is approximately one wave length ($1\lambda$). These measurements are preferred and other dimensions may be practiced without departing from the scope and spirit of the invention. The direction of the electric field at the aperture is indicated by an arrow 314. Located within the metal housing 310 is the primary reflector surface 334 coupled to the tapered wave guide feed-horn 330 with a wave guide input/output 332 oppositely positioned relative to the radiating aperture 312 within the housing 310. At the bottom of the tapered wave guide feed-horn 330 within the metal housing 310 is the rotating sub-reflector 320 for one dimensional beam scanning.

The antenna 300 uses one or more sub-reflectors 320 to couple the feed horn 330, 332 in an offset "pill-box" structure. The primary reflector 334 is shaped away from the traditional parabola to provide enhanced off-axis scanning angle with good sidelobe performance over the widest possible range of scan. The primary reflector 334 is coupled to the single feed-horn 330 via one or more sub-reflectors 320, which are also designed to have a profile that enhances the scan performance of the complete antenna assembly 300. One of these secondary mirrors 320 is arranged so that this sub-reflector 320 rotates, providing main beam scanning as the sub-reflector 320 spins. With careful mechanical and electrical design, in which the rotating sub-reflector 320 rotates about its center of mass, high speed scanning can be achieved.

Figure 4:
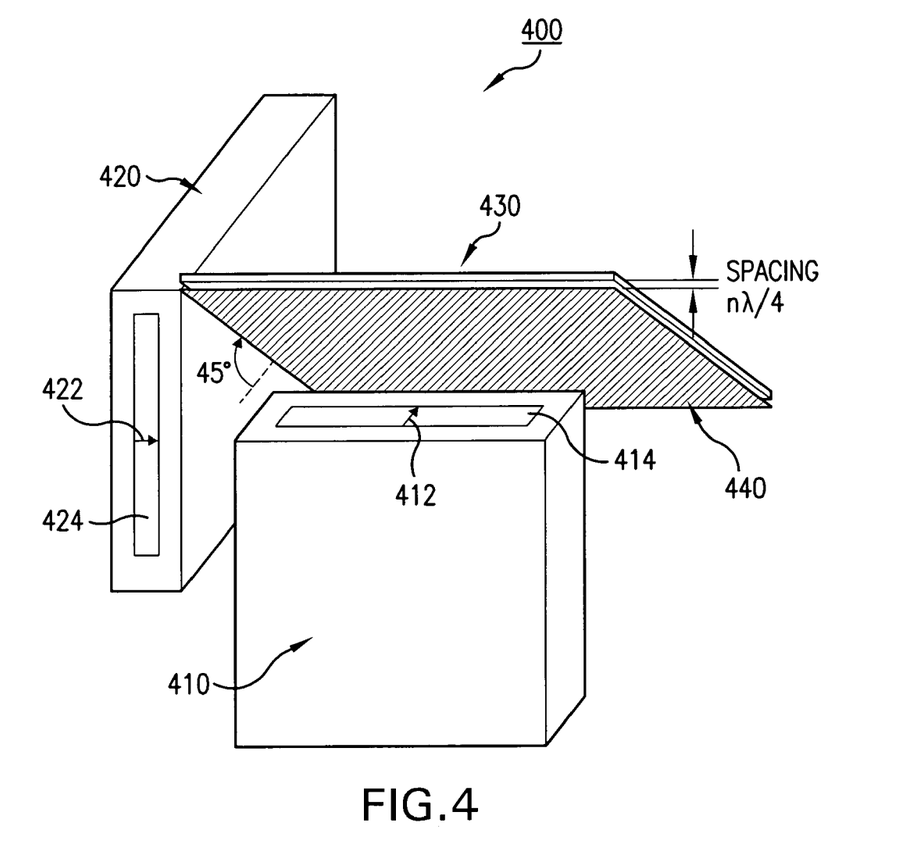
FIG. 4 is a perspective view of a combination of two pill-box antennas and a metallic reflector for producing a dual-scanning beam antenna with co-polarized far-field response in accordance with a further embodiment of the invention.

For the imaging system, a pair of independently-scanned, orthogonally-oriented fan beams are required, with the sense of electric polarization aligned in each beam. Two "pill-box" antennas 410, 420 of the type shown in FIG. 3 are used, configured 400 as shown in FIG. 4. The antenna 410 has an aperture 414 oriented lengthwise in a horizontal sense, while the other antenna 420 has an aperture 424 lengthwise in a vertical sense, as depicted in FIG. 4. The direction 412, 422 of the electric field in the respective apertures 414, 424 are shown. Thus, the aperture 424 couples directly to the observed scene, while the other aperture 414 is arranged at a right angle so that the aperture 414 is coupled via a passive reflecting screen 430, 440 and is oriented so that the narrow dimension of the far-field pattern of the aperture 414 is at right angles to the pattern of the other antenna 420.

The passive reflecting screen 430, 440 is generally configured at an angle of 45° relative the surface of the fan-beam antenna 410 having the aperture 414. The passive reflecting screen preferably has a planar metallic reflector 430 spaced apart by a multiple of a quarter wavelength ($n\lambda/4$) from a closely spaced, fine wire grid 440. The grid 440 is located between the reflector 430 and the antenna 410. The wires of the grid 440 are aligned at 45° to the direction of incident field polarization. This arrangement 400 results in orthogonal polarization in the far-field, if a standard plane reflector 430 is used.

Another way to achieve a co-polarized far-field response may be to modify the feed for the "pill-box" antenna 410, 420, so that the E-field vector is rotated through 90 degrees and aligned parallel to the long direction of the aperture. For this configuration, small variations in the surface quality and spacing of the metallic walls may cause significant degradation in antenna performance. However, for this arrangement, the polarization rotating filter 430, 440 is no longer required to be included.

The preferred way to achieve co-polarization is by the use of a "transreflector" 430, 440. The transreflector 430, 440 consists of the wire grid 440, with wires aligned at 45 degrees to the incident electric field vector, backed by the planar metallic mirror 430 spaced away by an odd-multiple of a quarter wavelength at the operating frequency. The wire spacing and wire diameter must both be small compared to the operating wavelength. Over a limited bandwidth determined by the spacing between the grid 440 and the reflector 430 (the higher the number of quarter wavelengths, the narrower the bandwidth), this arrangement results in a rotation of the polarization of the incident wave through 90 degrees, without significantly altering the far-field radiation pattern of the antenna system.

Figure 5:
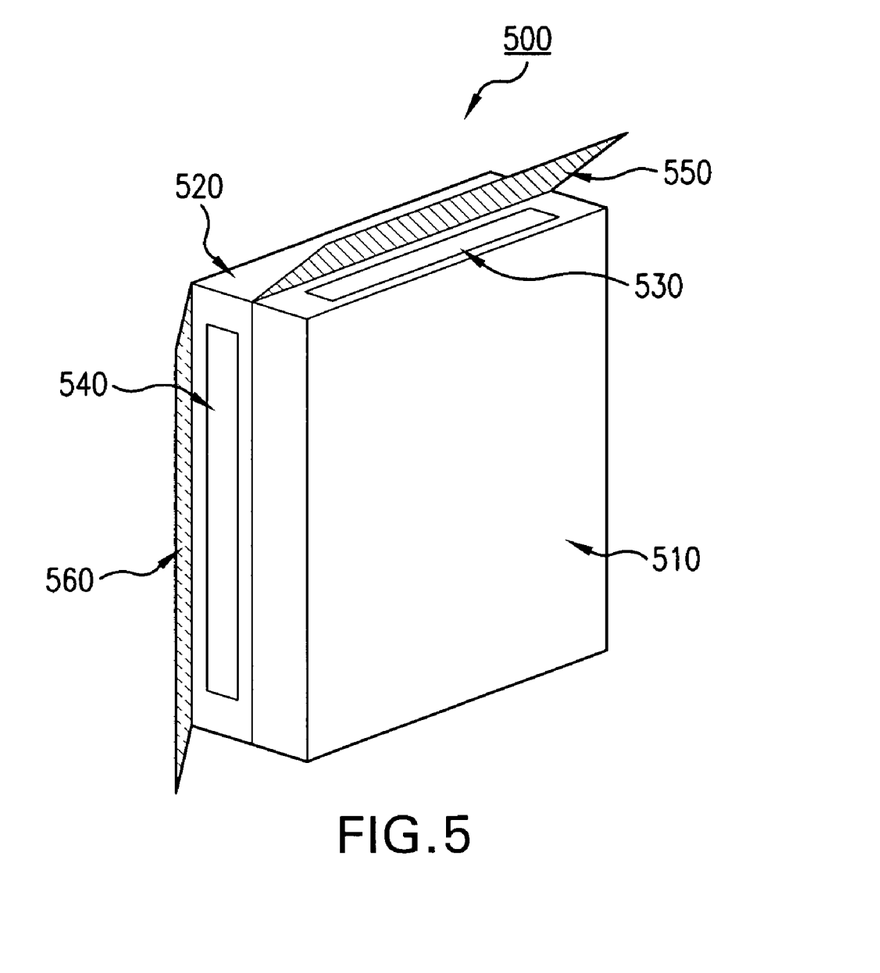
FIG. 5 is a perspective view of a combination of two pill-box antennas and two polarization rotating transreflectors that may be exchanged for planar metallic reflectors, for producing a dual-scanning beam antenna with co-polarized far-field response of either of two polarizations, in accordance with a further embodiment of the invention.

Two "pill-box" antennas 510, 520 of the type shown in FIG. 3 configured 500 in an alternative manner are shown in FIG. 5. Generally, FIG. 5 shows how two pill-box antennas can be placed with their flat sides parallel and the apertures oriented 90 degrees apart. In front of both apertures is a polarization rotating transreflector that can be exchanged with a planar metallic reflector, such that only one aperture receives polarization-rotated radiation at any time. This leads to a more compact structure than FIG. 4 that is capable of forming an image of either of two polarizations. The axes of the rotating sub-reflectors are parallel, so a simple gearing mechanism can be used to give the relative rotation rates needed for the intersection of the fan beams to perform a raster scan.

The antenna 510 has an aperture 530 oriented lengthwise in a horizontal sense, while the other antenna 520 has an aperture 540 oriented lengthwise in a vertical sense, as depicted in FIG. 5. In front of both apertures is a polarization rotating transreflector that can be exchanged with a planar metallic reflector, such that only one aperture receives polarization-rotated radiation at any time. In FIG. 5 the horizontal aperture 530 is coupled to the observed scene via a transreflector 550, while the vertical aperture 540 is coupled to the observed scene via a planar metallic reflector 560. The transreflector 550 may be exchanged with a planar metallic reflector, and the planar metallic reflector 560 may be exchanged with a transreflector, as indicated by the dotted lines on the reflector 560. An exchange may be effected by turning a polarization rotating transreflector by 180 degrees to use its back surface as a planar metallic reflector. An exchange may be effected by making the wires of a polarization rotating transreflector out of a material that has a switchable conductivity. The advantages of this configuration 500 over the configuration 400 in FIG. 4 are that the configuration 500 occupies a smaller overall volume and is capable of forming an image from either of two polarizations. The axes of the rotating sub-reflectors 320 are parallel in this configuration 500, so a simple gearing mechanism (not shown) can be used to achieve relative rotation rates that cause the intersection 130 of the fan beams 110, 120 to perform a raster scan of the field of view.

Figure 6:
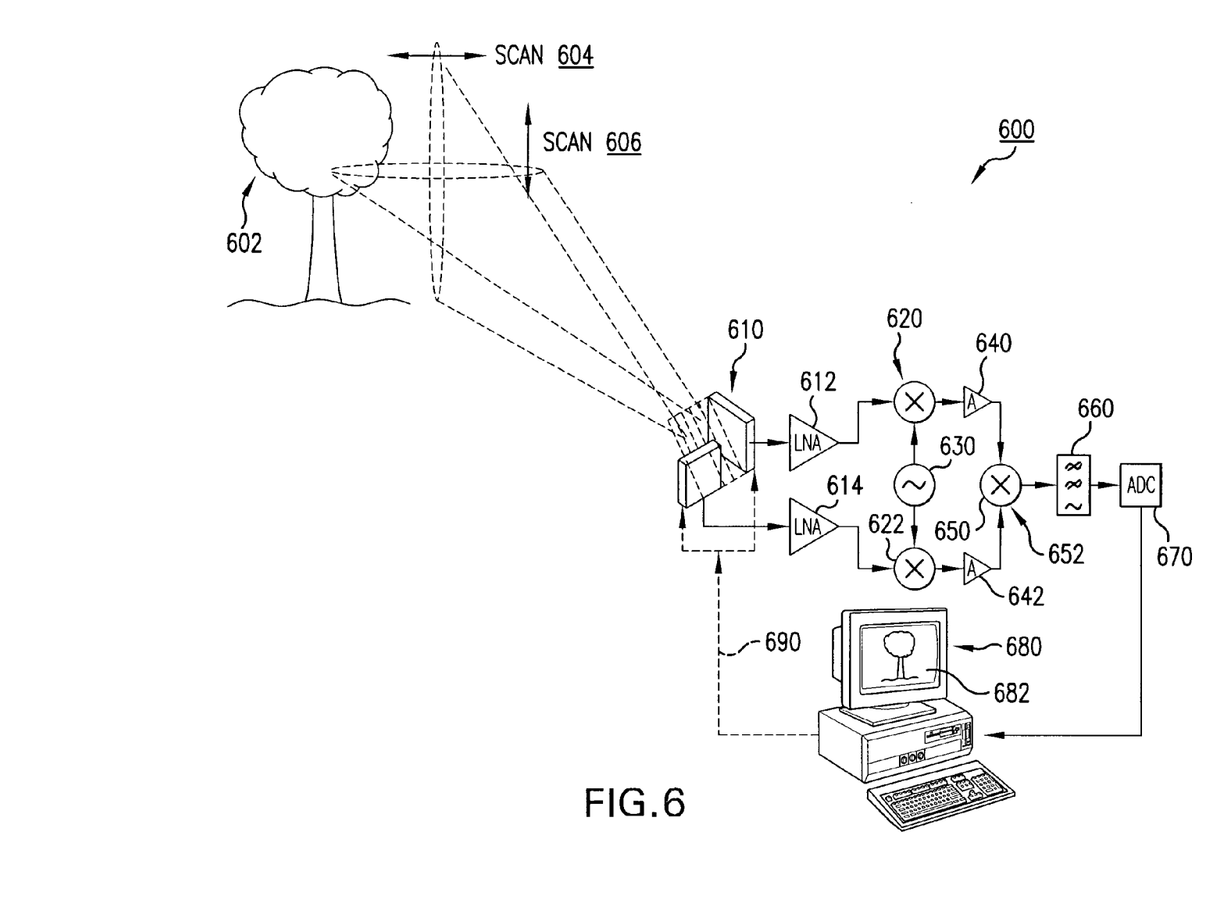
FIG. 6 is a block diagram illustrating a real-time cross-correlating millimeter-wave imaging system in accordance with a further embodiment of the invention, incorporating the dual fan-beam antenna of FIG. 4 or FIG. 5 in a modified millimeter-wave imaging system of FIG. 2.

FIG. 6 is a block diagram illustrating an implementation of a real-time, cross-correlating, millimeter-wave imaging system 600 in accordance with a further embodiment of the invention. For purposes of illustration only, the system is shown in FIG. 6 with a tree 602 as the object of imaging in the field of view. A dual, fan-beam antenna 610 is used to scan the object 602 and respective horizontal and vertical scans 604, 606 generated by the antenna 610 are shown. The dual fan-beam antenna 610 is of the type 400 shown in FIG. 4. Alternatively, the dual fan-beam antenna 610 may be of the type 500 shown in FIG. 5. The dual fan-beam antenna 610 provides respective E-plane and H-plane outputs to an imaging receiver system, similar to that shown in FIG. 2.

The E-plane output is provided to a low noise amplifier 612 and the H-plane output is provided to a different low noise amplifier 614. In turn, the low noise amplifiers 612, 614, acting as RF amplifiers, are coupled to respective mixers 620, 622. Further, a local oscillator 630 is coupled to both of mixers 620 and 622. The respective outputs of mixers 620 and 622 are provided as inputs to IF amplifiers 640, 642. The output of the IF amplifiers 640, 642 are provided to a cross-correlator 652.

The output of the cross-correlator 652 is provided to a base band filter 660. The base band filter 660 provides the output signal for the system. The output of the base band filter 660 is provided to an analogue to digital (A/D or ADC) converter 670. The ADC 670 produces digital data from the output signal that is provided as input to a computer 680. The computer 680 using hardware and/or software can produce a computer image 682 using the digital data from the ADC 670. In turn, using the digital data, the computer 680 can provide scan control signals 690 (indicated by dashed lines) to the dual fan-beam antenna 610. As shown in FIG. 6, the scan control signals 690 are preferably provided to each of the pill-box antennas.

The embodiments of the invention have various advantages including one or more of:

Use of a "pill-box" antenna to implement a scanned-beam imaging system;

A "pill-box" antenna in which the beam is scanned in one dimension using a rotating sub-reflector;

Use of a wire-grid transreflector to achieve a dual-scanning-beam system with co-polarized far-field response;

Use of two wire-grid transreflectors, exchangeable for planar metallic reflectors, to achieve switchable polarisation of the far-field response.

Use of a mechanically scanned beam so that only a single heterodyne receiver per beam is needed.

Use of two intersecting fan beams so that each antenna is required to scan only in one direction.

Thus, a method and an apparatus for forming an image from millimeter waves, a method and an antenna for receiving millimeter wave radiation, a method and an apparatus for receiving millimeter wave radiation for generating an image, and a method and system for millimeter wave imaging have been disclosed. In the light of this disclosure, it will be apparent to those skilled in the art that modifications, substitutions and/or changes may be made without departing from the scope and spirit of the invention.

The invention claimed is:

1. A method of receiving millimeter wave radiation, said method including the steps of:
    scanning a field of view using a fan beam to receive millimeter wave radiation;
    rotating polarization of incident millimeter wave radiation through 90 degrees using at least one polarization rotating transflector; and
    scanning said field of view using another fan beam to receive said polarization-rotated millimeter wave radiation, said fan beams intersecting and being geometrically orthogonal to each other, and said radiation being co-polarized, said fan beams are provided by respective fan beam antennas, each fan beam antenna being a modified pill-box antenna including:
- a metal housing with an elongated aperture in at least one side of said housing;
- a curved primary reflector surface located within said housing and opposite said aperture;
- a feed horn within said housing; and
- one or more sub-reflectors for coupling said feed horn to said primary reflector surface, at least one of said sub-reflectors being designed to rotate and providing one-dimensional beam scanning in a narrow direction of said other fan beam.

2. The method according to claim 1, wherein said polarization rotating transreflector includes:
- a planar metallic reflector; and
- a grid of closely spaced wires, said grid spaced $n \times \lambda/4$ from said planar metallic reflector, where n is an odd integer and $\lambda$ is a wavelength of said millimeter wave radiation.

3. The method according to claim 2, wherein said polarization rotating transreflector is positioned at a 45 degree angle relative to an aperture of said other fan beam antenna and at substantially 45 degrees relative to the direction of incident millimeter-wave radiation.

4. The method according to claim 1, further comprising the step of forming an image from said received millimeter wave.

5. The method according to claim 4, wherein polarizations of the electric fields of said two fan beams are substantially parallel in alignment.

6. The method according to claim 5, wherein millimeter wave radiation received in one of said fan beams is polarization rotation filtered.

7. The method according to claim 4, wherein said scanning steps are performed in azimuth and elevation defining a scan range, and an intersection region of said two fan beams is able to cover any point in said scan range.

8. The method according to claim 7, wherein said scan range determines said field of view and a beam width of each fan-beam in a narrow direction determines an angular resolution of said image.

9. The method according to claim 4, further including the step of measuring cross-correlated output dependent upon said received millimeter wave radiation at each field point in said field of view to produce a map of brightness.

10. The method according to claim 9, further including the step of controlling said two geometrically orthogonal, intersecting fan beams to generate said cross-correlated output at each fan beam intersection point in said field of view.

11. The method according to claim 4, wherein a polarization rotator changes the direction of incident polarization for one of said modified pill-box antennas.

12. The method according to claim 1, further including the steps of:
- downconverting components of said millimeter wave radiation received in accordance with said beams to generate respective intermediate frequency (IF) signals;
- cross-correlating said IF signals; and
- filtering the resulting cross-correlated signal to provide a value proportional to brightness at each point in the scene.

13. The method according to claim 12, further including the step of amplifying said received millimeter wave radiation in accordance with said beams prior to said step of downconverting.

14. The method according to claim 1, further comprising the steps of:

processing said received millimeter wave radiation, said processing step including:
- receiving components of millimeter wave radiation from an antenna received in accordance with said fan beams;
- downconverting respective components of said received millimeter wave radiation received to generate respective intermediate frequency (IF) signals;
- cross-correlating said IF signals; and
- filtering the resulting cross-correlated signal to produce a filtered, cross-correlated signal proportional to brightness at each point in said field of view as said antenna beams are scanned; and building up an image using said filtered, cross-correlated signal.

15. The method according to claim 14, further including the step of independently controlling the scanning of said antenna, so that said image can be generated from said filtered, cross-correlated signal, which provides a value proportional to the brightness of the scene at each point in the field of view.

16. An antenna for receiving millimeter wave radiation, said antenna including:
- a fan beam antenna for receiving millimeter wave radiation by scanning a field of view using a first fan beam;
- a filter comprising at least one polarization rotating transflector for rotating polarization of incident millimeter wave radiation through 90 degrees; and
- another fan beam antenna for receiving said polarization-rotated millimeter wave radiation by scanning a field of view using a second fan beam, said fan beams intersecting and being geometrically orthogonal to each other, and said radiation being co-polarized, said fan beam antennas each being a modified pill-box antenna including:
  - a metal housing with an elongated aperture in at least one side of said housing;
  - a curved primary reflector surface located within said housing and opposite said aperture;
  - a feed horn within said housing; and
  - one or more sub-reflectors for coupling said feed horn to said primary reflector surface, at least one of said sub-reflectors being designed to rotate and providing one-dimensional beam scanning in a narrow direction of said other fan beam.

17. The antenna according to claim 16, wherein said polarization rotating transreflector includes:
- a planar metallic reflector; and
- a grid of closely spaced wires, said grid spaced $n \times \lambda/4$ from said planar metallic reflector, where n is an odd integer and $\lambda$ is a wavelength of said millimeter wave radiation.

18. The antenna according to claim 17, wherein said polarization rotating transreflector is positioned at a 45 degree angle relative to an aperture of said other fan beam antenna and at a substantially 45 degree angle relative to the direction of incident millimeter-wave radiation.

19. An apparatus for forming an image from millimeter waves, said apparatus characterized by including:
- an antenna for receiving millimeter wave radiation according to claim 16; and
- a receiver for cross-correlating components of said received millimeter wave radiation from said fan beams.

20. The apparatus according to claim 19, wherein polarizations of the electric fields of said two fan beams are substantially parallel in alignment.

21. The apparatus according to claim 19, wherein scanning by said antenna is performed in azimuth and elevation defining a scan range, and an intersection region of said two fan beams is able to cover any point in said scan range.

22. The apparatus according to claim 21, wherein said scan range determines said field of view and a beam width of each fan-beam in a narrow direction determines an angular resolution of said image.

23. The apparatus according to claim 19, further including a processor for measuring cross-correlated output dependent upon said received millimeter wave radiation at each field point in said field of view to produce a map of brightness.

24. The apparatus according to claim 23, further including a controller for controlling said two geometrically orthogonal, intersecting fan beams to generate said cross-correlated output at each fan beam intersection point in said field of view.

25. An apparatus for receiving millimeter wave radiation for generating an image, said apparatus including:
   an antenna for receiving millimeter wave radiation according to claim 16;
   a downconverter for downconverting components of said millimeter wave radiation received in accordance with said first and second beams to generate respective intermediate frequency (IF) signals; and
   a correlator for cross-correlating said IF signals; and
   a filter for filtering the resulting cross-correlated signal to provide a value proportional to brightness at each point in the scene.

26. The apparatus according to claim 16, further including an amplifier for amplifying said received millimeter wave radiation in accordance with said first and second beams prior to downconverting.

27. A millimeter wave imaging system, including:
   an antenna for receiving millimeter wave radiation according to claim 16;
   a millimeter wave receiver coupled to said antenna, including:
      first and second receivers respectively coupled to said fan beam antennas respectively for receiving millimeter wave radiation in accordance with said fan beams;
      downconverters for downconverting respective components of said received millimeter wave radiation received from said first and second receivers to generate respective intermediate frequency (IF) signals;
      a correlator for cross-correlating said IF signals; and
      a filter for filtering the resulting cross-correlated signal to produce a filtered, cross-correlated signal proportional to brightness in said field of view as said antenna beams are scanned; and
   a processing unit for building up said image using said filtered, cross-correlated signal.

28. The system according to claim 27, wherein said processing unit independently produces control signals for scanning said antenna, so that said image can be generated from said filtered, cross-correlated signal, which provides a value proportional to the brightness of the scene at each point in the field of view.

* * * * *